Oct. 18, 1955 R. CLEMENT 2,721,182
NEW PIEZO-ELECTRIC CERAMIC MATERIAL AND PROCESS FOR MAKING IT
Filed Sept. 21, 1953
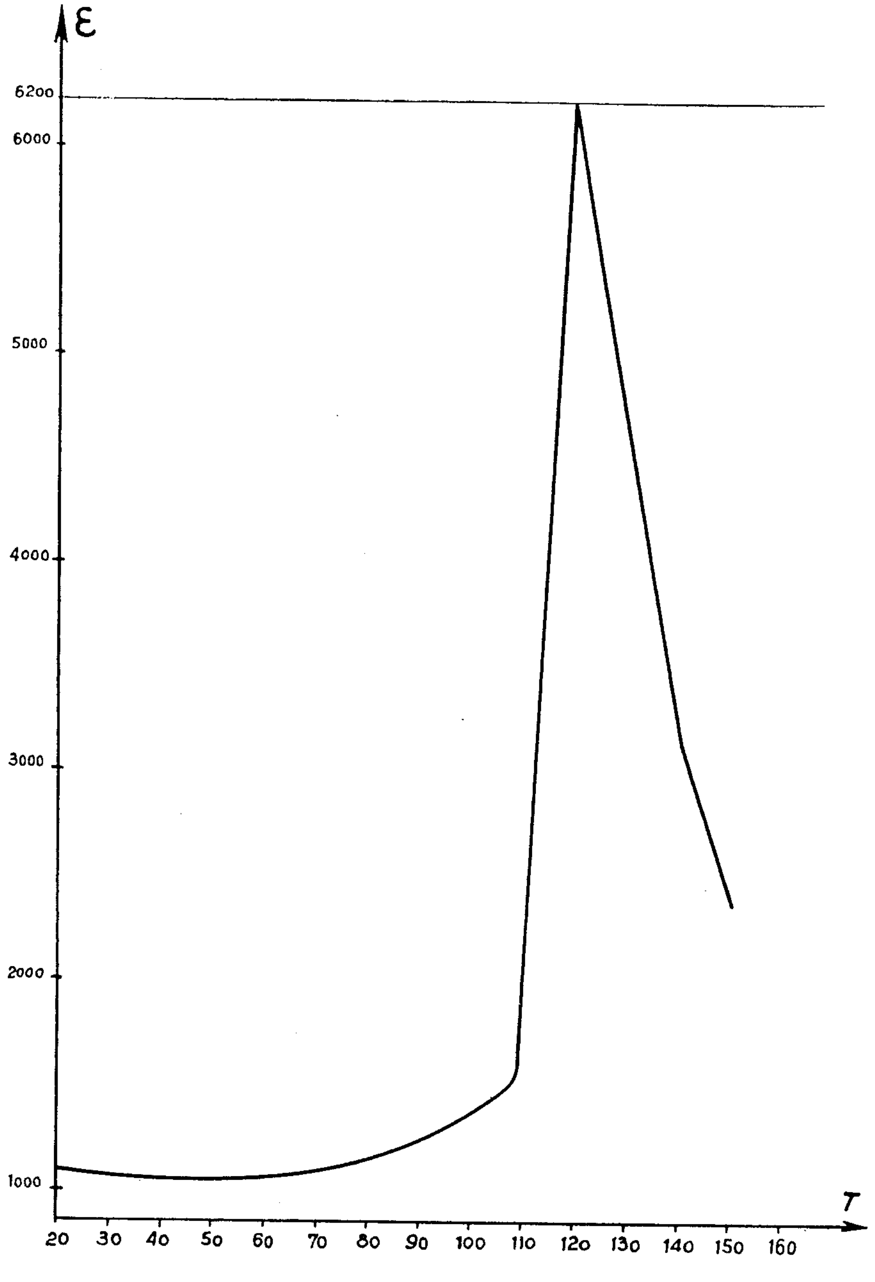
INVENTOR
Rene Clement
BY
Dean Fairbank & Hirsch
ATTORNEYS United States Patent Office 2,721,182

Patented Oct. 18, 1955

2,721,182

NEW PIEZO-ELECTRIC CERAMIC MATERIAL AND PROCESS FOR MAKING IT

René Clement, Paris, France, assignor to Compagnie Generale de Telegraphie Sans Fil, a corporation of France Application September 21, 1953, Serial No. 381,227

4 Claims. (Cl. 252—62.9)

The present invention relates to piezo-electric ceramic materials.

Piezo-electric crystals, illustratively of quartz, Seignette Salt, turmaline, niobates and tantalates of sodium or potassium and the like, possess in their crystalline arrangement one or more piezo-electric axes at the extremities of which there is manifestation of electric charge when the crystal is subjected to mechanical pressure. Conversely in applying an electric field normally to one of the piezo-electric axes, the crystal contracts or expands mechanically; a slice from such crystal cut in a definite direction with respect to any such axis may, when subjected to an alternating electric field of corresponding frequency be caused to vibrate mechanically at its inherent frequency.

The slicing referred to is a difficult operation, to be performed with precision in a rigorously determined direction.

Also are known piezo-electric ceramics, essentially mineral and crystallized at least in part. Such piezoelectric ceramic is frequently of the Perovskite type of lattice and composed of titanates of barium or titanates of barium and strontium or titanates of barium and lead, or titanates of barium, strontium and lead, obtained by finely grinding the corresponding oxides or carbonates mixed in suitable proportions and submitted to a thermal or firing treatment in very costly manufacturing ovens with carborundum resistances at a temperature which frequently is very high, to cause the oxides to combine chemically and to produce the desired crystalline lattice, and which is to be shaped into plates, slices, rods, tubes, balls or the like that are rendered less porous and more dense, as by the addition of a flux, such as ZnO, CdO or $CeO_2$ which lower the firing temperature, so that it will withstand the intense polarizing electric field and withstand the intense alternating field to place it into vibration.

The ceramic pieces of suitable form are coated with a layer upon each of two opposed faces and they are then polarized or rendered piezoelectric by subjection to a continuous, intense, electrostatic field, which results in a piezoelectric axis throughout the material in the direction of the applied field.

The fluxes referred to when added in high proportion, materially change the electric and piezoelectric properties of the titanate or titanates of the base material. More specifically the dielectric constant is considerably lowered and the power factor frequently rises. Frequently the temperature of the maximum dielectric constant (Curie point=120° C. for $BaTiO_3$), then becomes displaced toward lower temperature and the piezoelectric nodulus becomes very weak. If these fluxes are added in minor proportions, their efficacy is negligible, the firing temperature remaining very high and the resultant products lack the required impervious characteristics.

It is an object of the present invention to provide a ceramic material of predetermined composition and of good appearance which is impervious despite the employment of a firing temperature that is relatively low and which offers good electric and piezoelectric properties.

Another object is to provide a procedure for fabricating such ceramics, which shall be economical and adapted to production on a mass scale without the need for inordinately expensive or elaborate ovens.

The objects are achieved by the use, in place of the fluxes above mentioned, of germanium dioxide ($GeO_2$), hereinafter for lucidity, identified as "germanium oxide," as a flux in the manner more fully hereinafter set forth.

The ceramic piezoelectric product, according to the invention from its broadest aspect, comprises the following:

0.1 to 10 molar per cent of germanium oxide
99.9 to 90 molar per cent of any suitable piezoelectric ceramic.

The use of less than 0.1 per cent of $GeO_2$ has no appreciable effect, and of more than 10 percent, affords a product of poor loss factor.

The ceramic piezoelectric composition in question may be composed in major part of barium titanate. The selection of specific proportions of germanium oxide within the above range is determined by the exigencies of manufacture.

Where high quality performance and substantial reduction in baking temperature are important considerations, one to four (1 to 4) molar per cent of germanium oxide is employed. Where price is a primary consideration and less than the best performance suffices, one tenth to one (0.1 to 1) molar percent of the relatively expensive germanium oxide will suffice.

There will be used 4 to 10 molar percent of germanium oxide when it is desired to lower the firing temperature as much as possible.

One embodiment of piezoelectric product according to the invention, comprises at least in part chemical combinations of refractory oxides by molar percentage, as follows:

| | Percent |
|---|---|
| Titanium oxide | 50 to 22.5 |
| Barium oxide | 49.9 to 22.5 |
| Strontium oxide | 0 to 35 |
| Lead oxide (PbO) | 0 to 10 |
| Germanium oxide | 0.1 to 10 |

As is known to those skilled in the art, the strontium titanate following the inclusion of $SrO_2$ improves the dielectric constant of the ceramic; while the lead oxide serves as a flux which improves vitrification in the course of baking and so improves the imperviousness of the product. Preferably at least a part of the titanium, barium and strontium oxide are first fired together, then comminuted and mixed with the other components for the firing operation hereinafter described.

A more limited and desirable range of proportions of this formulation having the foregoing components, is by molar percentage as follows:

| | Percent |
|---|---|
| Titanium oxide | 45 to 49 |
| Barium oxide | 36 to 26 |
| Strontium oxide | 16 to 19 |
| Lead oxide (PbO) | 1.5 to 3.5 |
| Germanium oxide | 1.5 to 2.5 |

According to a preferred embodiment, the ceramic material is composed of refractory oxides within the above range, and specifically by molar percentage in the following proportions:

| | |
|---|---|
| Titanium oxide | 48 |
| Barium oxide | 31 |
| Strontium oxide | 17 |
| Lead oxide (PbO) | 2 |
| Germanium oxide | 2 |

The method of making the ceramic dielectric and piezoelectric materials according to the invention, consists in mixing the refractory powders in the foregoing proportions, to transform this mixture into a paste by incorporating therewith an organic binder and to form the pieces of the desired shape by molding or extrusion and firing the pieces at a temperature between 1200 and 1450° C. In the course of this firing operation, which is preferably effected in an oxidizing atmosphere, there is attained preferably a slow rise of temperature up to 800° C., so as to permit the escape of the organic binder.

The resultant product is characterized by vitrification and imperviousness, and is at least in large part in the form of chemical combination (titanates, germanates, etc.). In the resultant product, the oxide of germanium in particular may be found to be vitreous in character.

The accompanying figure given by way of non-limitative example and serving for better understanding of the invention, shows the variation curve of the product, attained with the composition of the example which follows, in the dielectric constant *e* as a function of the temperature *t*.

In a preferred procedure for producing the ceramic, there are mixed in a ball mill the following components by weight:

| | Parts |
|---|---|
| Titanium oxide | [1] 20.6 |
| Barium carbonate | [1] 50.8 |
| Titanium oxide | 10.3 |
| Barium carbonate | 25.4 |
| Lead oxide | 1.8 |
| Germanium oxide | 1.8 |

[1] Previously fired to 1300° C.

After the components have been ground to an intimately mixed powder, there is added an organic binder such as ceresine, for example.

The paste is molded into form by any known means such as pressure molding or extrusion. The molded or extruded product is then subjected to firing in an oxidizing atmosphere at a temperature of 1250° C. which is maintained for one hour, and in the course of which the organic binder escapes.

After cooling the piece is quite impervious and is good in appearance. After metallizing opposed surfaces of the piece by means of a conducting paint of silver, for example, its electric and piezoelectric properties are measured.

The curve of the dielectric coefficient *e* as a function of the temperature *t* on the figure shows that the dielectric constant rises very sharply from about 1100 at 20° C. to a maximum of about 6000 at about 120° C., and then drops off sharply.

The loss factor measured at 1000 kilocycles is of the order of one (1%) percent at 20° C. and it improves to one-half (0.5%) percent at 120° C. The insulating resistance is very high. The piezoelectric properties are also excellent.

It is of course to be understood that the invention is not limited to application for the manufacture of piezoelectric elements or condensers, but is useful in other applications.

As many changes could be made in the above product and process, and many apparently widely different embodiments of this invention could be made without departing from the scope of the claims, it is intended that all matter contained in the above description, or shown in the accompanying drawing, shall be interpreted as illustrative and not in a limiting sense.

Having thus described my invention, what I claim as new and desire to secure by Letters Patent of the United States is:

1. Ceramic piezoelectric product consisting essentially of by molar percentage:

| | Percent |
|---|---|
| Titanium oxide | 50 to 22.5 |
| Barium oxide | 49.9 to 22.5 |
| Strontium oxide | 0 to 35 |
| Lead oxide (PbO) | 0 to 10 |
| Germanium oxide | 0.1 to 10 |

2. Ceramic piezoelectric product comprising by molar percentage:

| | Percent |
|---|---|
| Titanium oxide | 45 to 49 |
| Barium oxide | 33 to 29 |
| Strontium oxide | 15 to 19 |
| Lead oxide (PbO) | 1.0 to 3.5 |
| Germanium oxide | 1.5 to 2.5 |

3. Ceramic piezoelectric product consisting by molar percentage essentially of:

| | Percent |
|---|---|
| Titanium oxide | 48 |
| Barium oxide | 31 |
| Strontium oxide | 17 |
| Lead oxide (PbO) | 2 |
| Germanium oxide | 2 |

4. The process of preparing ceramic piezoelectric product by mixing intimately and grinding to a powder the following components in the following proportions by weight:

| | Parts |
|---|---|
| Titanium oxide | [1] 20.6 |
| Barium carbonate | [1] 50.8 |
| Titanium oxide | 10.3 |
| Barium carbonate | 20.4 |
| Lead oxide (PbO) | 1.8 |
| Germanium oxide | 1.8 |

[1] Previously fired together to 1300° C.

converting this mixture into a paste by adding thereto an organic binder, molding the paste to the desired form and baking the said paste in this form in an oxidizing temperature with the elimination of the binder at a temperature of about 1250° C., maintained for one hour.

References Cited in the file of this patent

UNITED STATES PATENTS

| | | |
|---|---|---|
| 2,540,412 | Adler | Feb. 6, 1951 |
| 2,538,554 | Cherry | Jan. 16, 1951 |
| 2,614,144 | Howatt | Oct. 14, 1952 |

OTHER REFERENCES

Ceramic Industry, January 1945, page 89.